United States Patent
Bullman et al.

(10) Patent No.: US 6,848,059 B2
(45) Date of Patent: Jan. 25, 2005

(54) SYSTEM AND METHOD FOR PROCESSING WAKE-UP SIGNALS IN A NETWORK

(75) Inventors: William R. Bullman, Bethlehem, PA (US); Ryan S. Holmqvist, Basking Ridge, NJ (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 624 days.

(21) Appl. No.: 09/845,801

(22) Filed: Apr. 30, 2001

(65) Prior Publication Data

US 2002/0162038 A1 Oct. 31, 2002

(51) Int. Cl.[7] ............................. G06F 1/26; G06F 15/16
(52) U.S. Cl. ...................................... 713/323; 709/203
(58) Field of Search ............................. 713/323, 310; 709/203, 224

(56) References Cited

U.S. PATENT DOCUMENTS 6,134,665 A   10/2000   Klein et al. ................. 713/300
6,415,387 B1 *  7/2002   Aguilar et al. .............. 713/320
6,556,584 B1 *  4/2003   Horsley et al. ............. 370/465
6,694,440 B1 *  2/2004   Ishibashi .................... 713/310

FOREIGN PATENT DOCUMENTS

WO        WO 9613106 A1 *  5/1996  ........... H04L/12/12

* cited by examiner

Primary Examiner—Lynne H. Browne
Assistant Examiner—Eric Chang
(74) Attorney, Agent, or Firm—Synnestvedt Lechner & Woodbridge, LLP

(57) ABSTRACT

A system and method for processing wake-up signals during a sleep mode of a computer in a communications network to wake up sleeping components of the computer. The system includes an extended PHY (physical layer) device for receiving wake-up signals from a network medium, converting the wake-up signals into an additionally-encoded data packet, and generating a standardized wake-up packet based on the additionally-encoded data packet. The system also includes a MAC (media access controller) device, coupled to the extended PHY device, for receiving the standardized wake-up packet and generating a wake-up notification signal in response to the standardized wake-up packet to wake up the sleeping to components of the computer.

28 Claims, 5 Drawing Sheets

SYSTEM AND METHOD FOR PROCESSING WAKE-UP SIGNALS IN A NETWORK

BACKGROUND OF THE INVENTION

1. Field of the Invention

The present invention relates to computer network systems and, more particularly, to a system and method for processing wake-up signals during a sleep mode of a computer in a network system.

2. Discussion of Related Art

In a conventional network such as a Local Area Network (LAN), a plurality of computers are configured to communicate with each other over a shared network medium such as coaxial cables. When computers in the network are not in use, generally they are configured to enter automatically a "sleep" mode, so as to save power. This "sleep" mode involves removing power from most components of the computer, except for a few designated components that need to stay "awake", i.e., fully powered, to wake up the computer whenever appropriate. These designated components monitor incoming signals on the network medium and determine whether the incoming signals are wake-up signals for waking up the sleeping components of the computer.

In a computer of a popular LAN such as the Ethernet, a Physical Layer (PHY) device and a Media Access Controller (MAC) device are designated to stay awake during a sleep mode of the computer. The PHY and MAC devices receive wake-up signals off the network medium and process the wake-up signals to awake the sleeping components of the computer. Currently, MAC devices are manufactured according to well-defined standards and specification.

Particularly, a conventional method of processing wake-up signals during a sleep mode of a computer in a network such as the Ethernet is as follows. When another computer in the same network or a different network desires to wake up a particular sleeping computer, it generates wake-up signals and transmits them over the shared network medium to the sleeping computer. The wake-up signals can carry a predetermined pattern of data ("wake-up data") needed to wake up the sleeping computer as well as additional data to be processed ("processing data") by the sleeping computer after the sleeping computer wakes up, or can carry just the wake-up data. The wake-up signals can also be packet-based, that is, they are convertible into data packets.

The PHY device receives these wake-up signals off the network medium and converts them into a conventional standardized data packet consistent with a predetermined packet standard such as the standardized Ethernet packet format, IEEE standard 802.3 for the Ethernet. FIG. 1A is a diagram of such a standardized, conventional Ethernet packet format. As shown in FIG. 1A, a standardized Ethernet data packet 8 is composed of a destination address section 2 for identifying the destination of the packet, a source address section 3 for identifying the source of the packet, a length/type section 4 for identifying the length or type of the packet, a data section 6 containing data including wake-up data and processing data, and a CRC (cyclic redundancy check) section 7 for providing error-detecting capabilities.

Once the PHY device prepares the data packet based on the wake-up signals, the PHY device sends the prepared data packet to the MAC device. Then the MAC device compares a pattern of data contained in the received data packet with a prestored wake-up data pattern using its very limited pattern matching capability. This involves a bit-by-bit comparison of data. If there is a match, i.e., a data pattern in the data packet matches the prestored wake-up data pattern, then the MAC device determines that the current data packet is a proper wake-up packet, and generates a wake-up notification signal to a CPU in the computer in response to the matching result. On the other hand, if there is no match, the data packet is ignored and no wake-up notification signal is generated, allowing the computer to remain asleep.

Upon receipt of the wake-up notification signal, the CPU then wakes up the sleeping components such as a MAC driver according to known techniques. Then the now awaken MAC driver informs the MAC device that the MAC driver is now ready and able to receive data packets from the MAC device. Since the data packet prepared by the PHY device also contains the "processing data" to be processed by the computer, the MAC device transmits the data packet to the MAC driver which in turn transmits it to appropriate protocol and application layers for processing. In this manner, wake-up signals are processed in a conventional network system.

As networking technology develops, new network standards and systems are introduced. New network systems often employ an additional protocol layer (referred to herein as an "extended protocol layer") for adding additional variable length encoding data into the standardized data packet to improve the data integrity and robustness of the system. Such a packet is referred herein as an "additionally-encoded data packet." FIG. 1B shows an example of such an additionally-encoded data packet 8A. As shown in FIG. 1B, the additionally-encoded packet 8A is a standardized Ethernet packet 8 (shown in FIG. 1A) with variable length additional encoding data 5 inserted in the packet 8.

In a network system where a computer includes an extended protocol layer and receives wake-up signals that carry additional encoding data and wake-up data, the PHY device of the computer converts the wake-up signals into a corresponding additionally-encoded data packet, rather than a standardized data packet due to the additional encoding data. The PHY device then forwards the additionally-encoded data packet to the MAC device and the MAC device attempts to detect the wake-up data in the packet.

At this time, however, a significant problem arises because the conventional MAC device with the very limited matching capability is unable to locate the wake-up pattern in the additionally-encoded data packet due to the additional encoding that is variable in length. And, if the conventional MAC device is unable to detect the wake-up pattern, the system loses the ability to wake-up the sleeping components and becomes non-responsive, resulting in malfunctions and possible system failures.

To address this problem, one may alter the entire configuration of the currently manufactured MAC device hardware and/or MAC driver software so that the MAC device can carry out a more sophisticated wake-up pattern detection scheme. But, such modifications are expensive and rather complicated, and will require significant alterations to the existing hardware and software, which can affect the overall operation of the entire network system. Furthermore, each time new industry network standards are introduced, the MAC hardware and software will need to change, which would be extremely expensive and likely to introduce computer bugs to the system.

It is obviously an advantage to reuse existing, well-defined network components such as MAC devices and drivers from a technical reuse and cost perspective. Therefore, a need exists for a system and method for processing wake-up signals during a sleep mode of a network computer which overcomes problems encountered in conventional methods and systems without requiring significant modifications to the existing MAC devices and MAC drivers.

SUMMARY OF THE INVENTION

The present invention is directed to a system and method for processing wake-up signals during a sleep mode of a computer in a network system which processes additionally-encoded data packets, i.e., data packets having additional encoding data for improving robustness and data integrity of the system.

Particularly, the present invention provides an improved PHY device that is capable of generating a standardized wake-up packet when wake-up signals are received on a network medium. These wake-up signals carry additional encoding data, wake-up data, and processing data which needs to be processed by the computer once the computer wakes up. To generate the standardized wake-up packet, the improved PHY device converts the wake-up signals into a corresponding additionally-encoded data packet. This packet contains the additional encoding data, and the wake-up data and the processing data in a data section of the packet. The PHY device is prestored with information about the additional encoding data and the wake-up data so that it is able to determine the location of the wake-up data in the packet. Based on this information, the PHY device locates the wake-up data in the packet and generates a standardized wake-up packet by including the located wake-up data in the new packet. The PHY device then sends the generated, standardized wake-up packet to the wake-up logic of a MAC device and, at the same time, transmits the additionally-encoded data packet to the MAC device for temporary storage.

Upon receipt of the standardized wake-up packet, the wake-up logic of the MAC device verifies that the received wake-up packet is a proper wake-up packet by comparing a pattern of the data stored in the packet with a prestored wake-up data pattern. Then the wake-up logic generates a predetermined wake-up notification signal in response to the proper wake-up packet and sends the notification signal to the CPU in the sleeping computer. The CPU then wakes up all sleeping components of the computer, including a MAC driver, an extended protocol layer, and protocol and application layers, according to conventional techniques. Then the awakened MAC driver informs the MAC device that it is now ready and able to receive data packets. In response to this notice, the MAC device forwards the stored, additionally-encoded data packet to the MAC driver. The MAC driver then sends the received packet to the extended protocol layer which then removes the additional encoding data from the received packet. The remaining packet would be a standardized data packet. This standardized data packet is then sent to the protocol and application layers so that the processing data in the packet can be processed.

The operation of the MAC device, the MAC driver, the extended protocol layer and other application layers in the present invention is the same as the conventional system, because the PHY device prepares and sends the standardized wake-up packet to the MAC device for generating a wake-up notification signal. In other words, the present invention allows the existing MAC device, the MAC driver, the extended protocol layer and other application layers currently available in the market to be used without any modification to their configurations to process wake-up signals carrying wake-up data and additional encoding data. This is accomplished through the operation of the improved PHY device.

Accordingly, by modifying only the conventional PHY device, and not the conventional MAC device hardware and/or MAC driver software, the present invention permits wake-up signals carrying wake-up data and additional encoding data to be processed. This is a significant advantage since one skilled in the art readily understands that it is much less complicated and less costly to modify the PHY device than to modify the MAC hardware and software. Furthermore, the present invention accommodates easily any new packet standards which may be introduced in the future by configuring the PHY device to generate a standardized wake-up packet regardless of what encoding is provided in the received wake-up signals.

DETAILED DESCRIPTION OF THE PREFERRED EMBODIMENTS

Figure 1A:
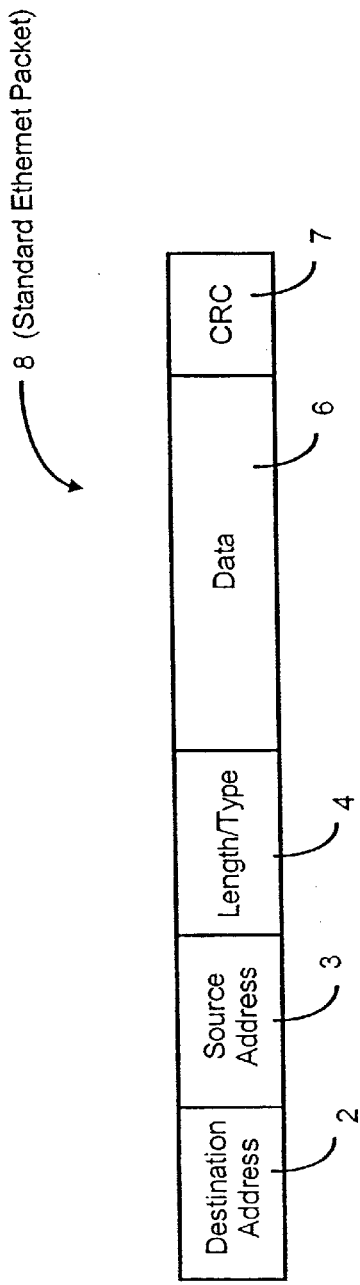
FIG. 1A is a diagram of a typical standardized Ethernet data packet.
Figure 1B:
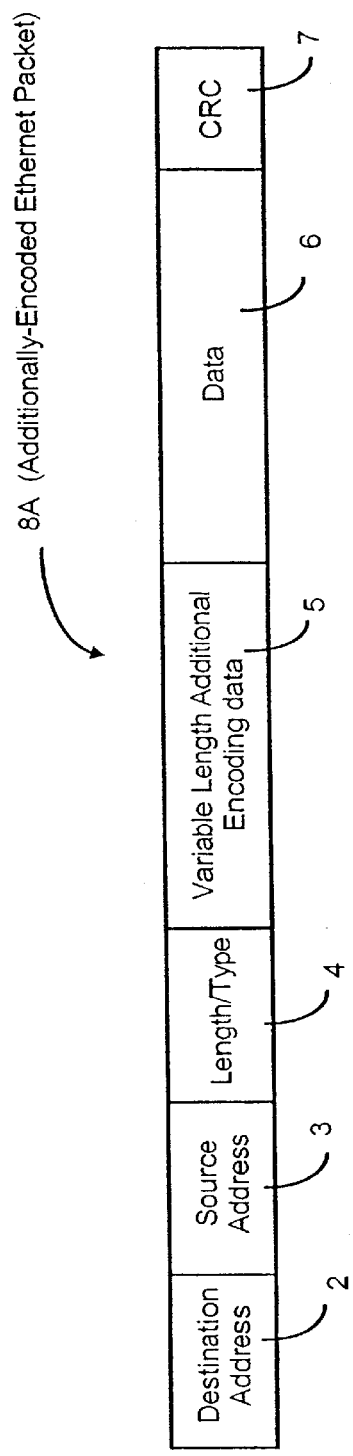
FIG. 1B is a diagram of a typical additionally-encoded Ethernet packet.

In the drawings, the same reference numerals are used to indicate the same elements.

Figure 2:
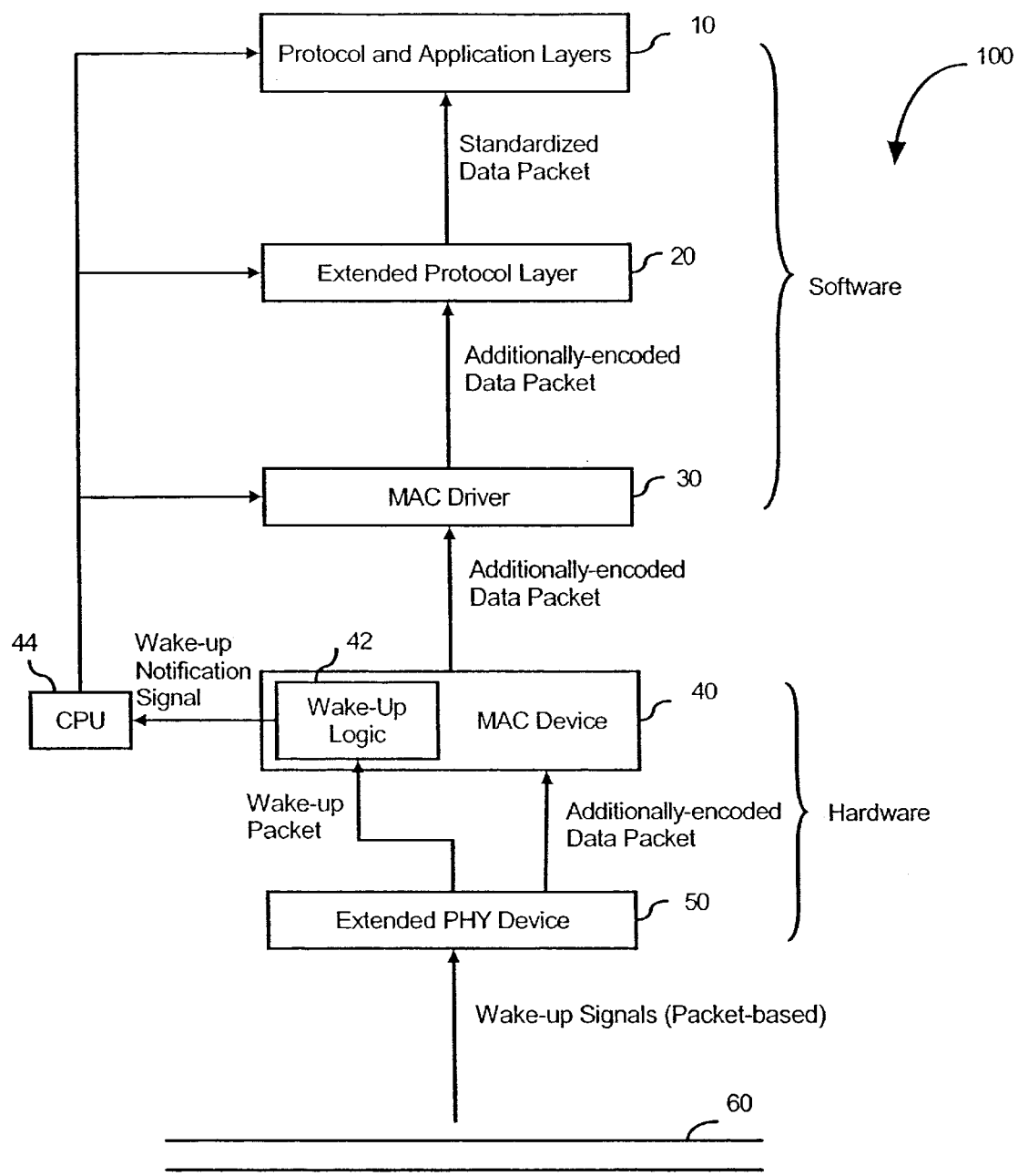
FIG. 2 is a diagram of a system for processing wake-up signals during a sleep mode of a computer in a network according to a first embodiment of the present invention.

FIG. 2 is a block diagram of a system 100 for processing wake-up signals during a sleep mode of a computer in a communications network according to a first embodiment of the present invention. The system 100 is implemented in a computer of a packet-based network system such as the Ethernet where data is communicated in packets and where wake-up signals carry wake-up data as well as additional encoding data that is variable in length. As shown in FIG. 2, the system 100 includes protocol and application layers 10, an extended protocol layer 20, a MAC driver 30, a MAC device 40 including wake-up logic 42, an extended PHY device 50, and a network medium 60, all operatively coupled. All of the components (10, 20, 30, 40 and 60) are conventional components that operate in the manner well known in the network art, except for the extended PHY device 50.

The extended PHY device 50 is a modified version of a conventional PHY device and is capable of generating a standardized "wake-up" packet based on an additionally-encoded data packet. The extended PHY device 50 is prestored with information about additional encoding data and wake-up data so that it is able to determine the location of the wake-up data in the packet. This information can be provided by the system 100 before the system 100 falls asleep, or by computers in other systems that generate the wake-up signals.

When the system 100 enters a sleep mode, the protocol and application layers 10, the extended protocol layer 20 and the MAC driver 30 are asleep, i.e., power is removed therefrom. The MAC device 40 and the extended PHY device 50 remain awake, i.e., fully powered. If another computer in the same network or another network (that inserts additional encoding data into data packets) desires to wake up the system 100, then that computer generates wake-up signals and transmits them to the system 100 over the network medium 60. Here, the wake-up signals are packet-based signals representing an additionally-encoded data packet containing additional encoding data, and wake-up data and processing data in a data section of the packet. Depending on the application, the data section of the packet may contain just the wake-up data, or both the wake-data and processing data. The processes of entering the sleep mode and generating the wake-up signals occur according to conventional techniques.

The extended PHY device 50 receives the wake-up signals off the medium 60 and converts them into a corresponding additionally-encoded data packet by demodulating the analog signals on the medium 60. Since the extended PHY device 50 is prestored with information about the additional encoding data and the wake-up data, based on this information, the extended PHY device 50 locates the wake-up data contained in the additionally-encoded data packet, and generates a standardized "wake-up" packet containing the located wake-up data. The standardized wake-up packet is a packet of data carrying the wake-up data (a predetermined pattern of data designated by the system for triggering generation of a wake-up notification signal by the wake-up logic 42 of the MAC device 40). The standardized wake-up packet follows a standard data format such as the standardized Ethernet format (as shown in FIG. 1A). According this format, the entire data stored in the data section 6 of the data packet (FIG. 1A) will be the wake-up data.

The extended PHY device 50 forwards the generated wake-up packet to the wake-up logic 42 of the MAC device 40 and, at the same time, forwards the additionally-encoded data packet to the MAC device 40 for temporary storage of the packet. The wake-up logic 42 compares a data pattern of the received wake-up packet with a wake-up data pattern prestored in the MAC device 40 and verifies that it is a proper wake-up data pattern. Since the wake-up logic 42 receives only the standardized wake-up packet, rather than an additionally-encoded data packet having variable encoding data as in the conventional system, conventional wake-up logic with limited matching capability can be used as the wake-up logic 42 according to the present invention. As a result, the present invention allows the use of a conventional MAC device, whereby the wake-up data contained in the additionally-encoded data packet can be processed with no modification to the conventional MAC device.

In response to the standardized wake-up packet, the wake-up logic 42 generates a predetermined wake-up notification signal to a CPU 44 in the system 100, which in turn wakes up all sleeping components, including the MAC driver 30, the extended protocol layer 20 and the protocol and application layers 10 according to known techniques. Once the sleeping components wake up and return to the awake mode of operation, the awakened MAC driver 30 informs the MAC device 40 that it is now ready and able to receive data packets. At this point, if the additionally-encoded data packet is carrying any processing data, the MAC device 40 sends the additionally-encoded data packet to the MAC driver 30. But, if the additionally-encoded data packet is not carrying any processing data, the additionally-encoded data packet need not be sent to the MAC driver 30 since that packet does not contain any data that needs to be processed by the MAC driver 30.

The MAC driver 30 receives the additionally-encoded data packet and forwards it to the extended protocol layer 20. The extended protocol layer 20 then removes the additional encoding data from the packet. The remaining packet will be a standardized data packet, i.e., a packet having a standardized data packet format (such as one shown in FIG. 1A). This standardized data packet is sent to the protocol and application layers 10 for appropriate processing. The removal of the additional encoding data from the additionally-encoded data packet by the extended protocol layer 20 occurs according to known techniques, e.g., by prestoring, in the extended protocol layer 20, information about the location of the additional encoding data in expected data packets.

One skilled in the art would readily appreciate that the protocol and application layers 10, the extended protocol layer 20, and the MAC driver 30 are computer software whereas the MAC device 40, the extended PHY device 50 and the medium 60 are mainly hardware. The network medium 60 is any medium that carries signals (e.g., electrical, optical, radio, etc.) to other devices in the network for enabling communication between these devices, and can be, e.g., coaxial cable, optical fiber, twisted wire, etc.

Figure 3:
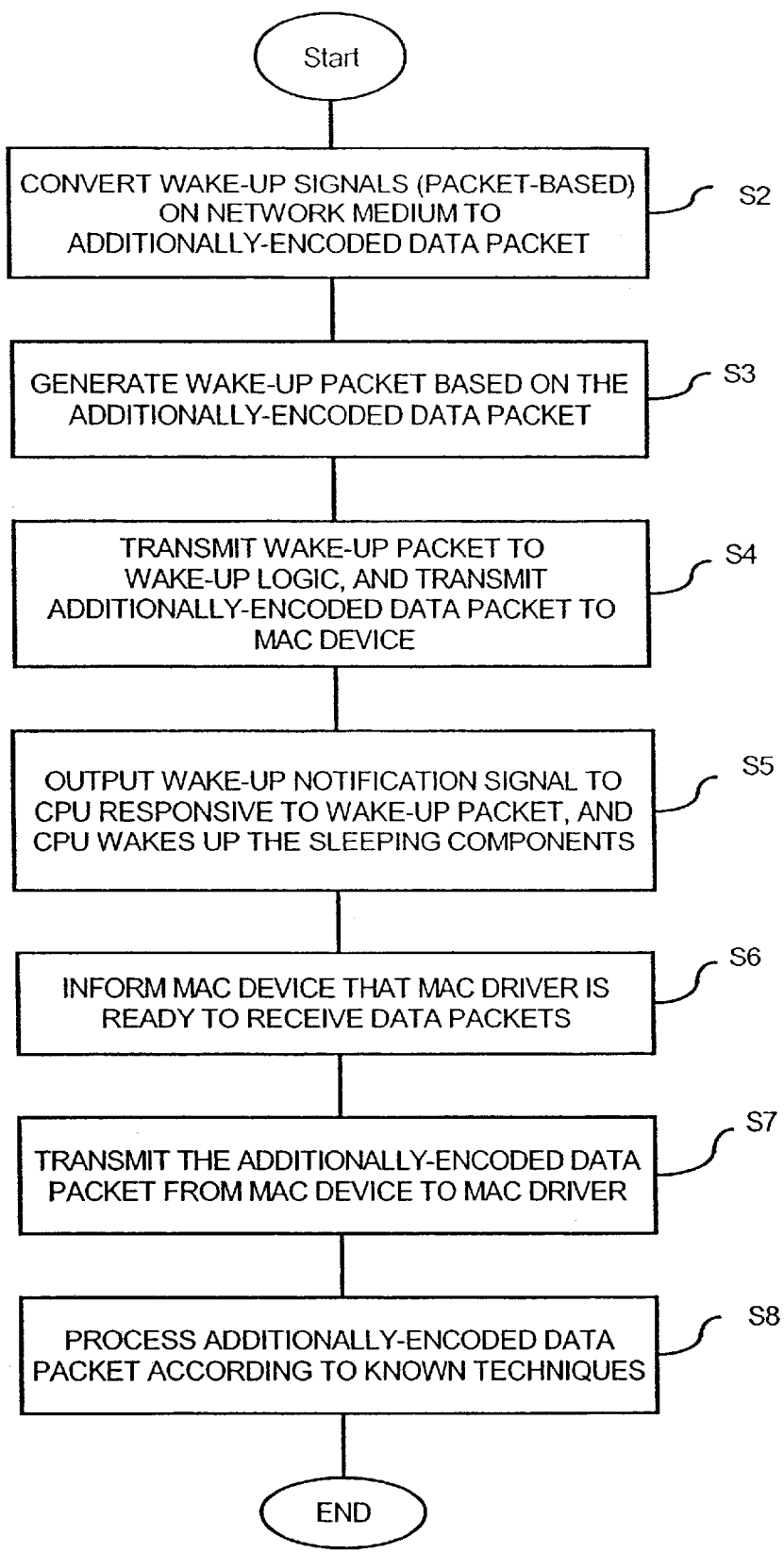
FIG. 3 is a flowchart illustrating the processing steps of a method for processing wake-up signals during a sleep mode of a computer in a network according to a first embodiment of the present invention.

FIG. 3 is a flowchart illustrating the processing steps of a method for processing wake-up signals during a sleep mode of a computer in a communications network according to a first embodiment of the present invention. These processing steps can be implemented by the system 100 shown in FIG. 2 in which additionally-encoded data packets are processed and wake-up signals are packet-based. As shown in FIG. 3, when another computer transmits wake-up signals to wake up the system 100 that has entered a sleep mode, the extended PHY device 50 in the system 100 converts in Step S2 the wake-up signals on the network medium 60 into a corresponding additionally-encoded data packet. In this embodiment, the additionally-encoded data packet includes wake-up data, processing data and additional encoding data.

In Step S3, the PHY device 50 generates a standardized wake-up packet based on the additionally-encoded data packet as discussed above. In Step 84, the generated, standardized wake-up packet is sent to the wake-up logic 42 and the additionally-encoded data packet is sent to the MAC device 40 for temporary storage until the sleeping components wake up. In Step S5, a data pattern in the wake-up data packet is compared with a wake-up data pattern prestored in the MAC device 40 by the wake-up logic 42 using conventional techniques. If the comparison results indicate that there is a match, a predetermined wake-up notification signal is generated by the wake-up logic 42 and output to the CPU 44 of the computer. If there is no match, no wake-up notification signal is generated and the received wake-up packet may be discarded. In response to the wake-up notification signal, the CPU 44 wakes up the sleeping components such as the MAC driver 30, the extended protocol layer 20 and the protocol and application layers 10 according to known techniques.

In Step S6, the awakened MAC driver 30 informs the MAC device 40 that it is now ready and able to receive data packets. In Step S7, the additionally-encoded data packet temporarily stored in the MAC device 40 is transmitted to the MAC driver 30 since the additionally-encoded data packet contains processing data to be processed by the awakened computer. In Step S8, the MAC driver 30 processes the additionally-encoded data packet in a conventional manner. For instance, the MAC driver 30 forwards the additionally-encoded data packet to the extended protocol layer 20. The extended protocol layer 20 then removes the variable additional encoding data from the additionally-encoded data packet. The remaining packet will be a standardized data packet. This standardized data packet is then sent to the protocol and application layers 10 for appropriate processing of the data in the packet.

In a different embodiment, the data section of the additionally-encoding data packet may carry just the wake-up data without any processing data. In such cases, in Step S7, that additionally-encoded data packet may not be sent to the MAC driver 30 since it does not contain any processing data to be processed by the MAC driver 30. Instead, new data packets received after the computer wakes up are sent to the MAC driver 30 for processing in a conventional manner.

Figure 4:
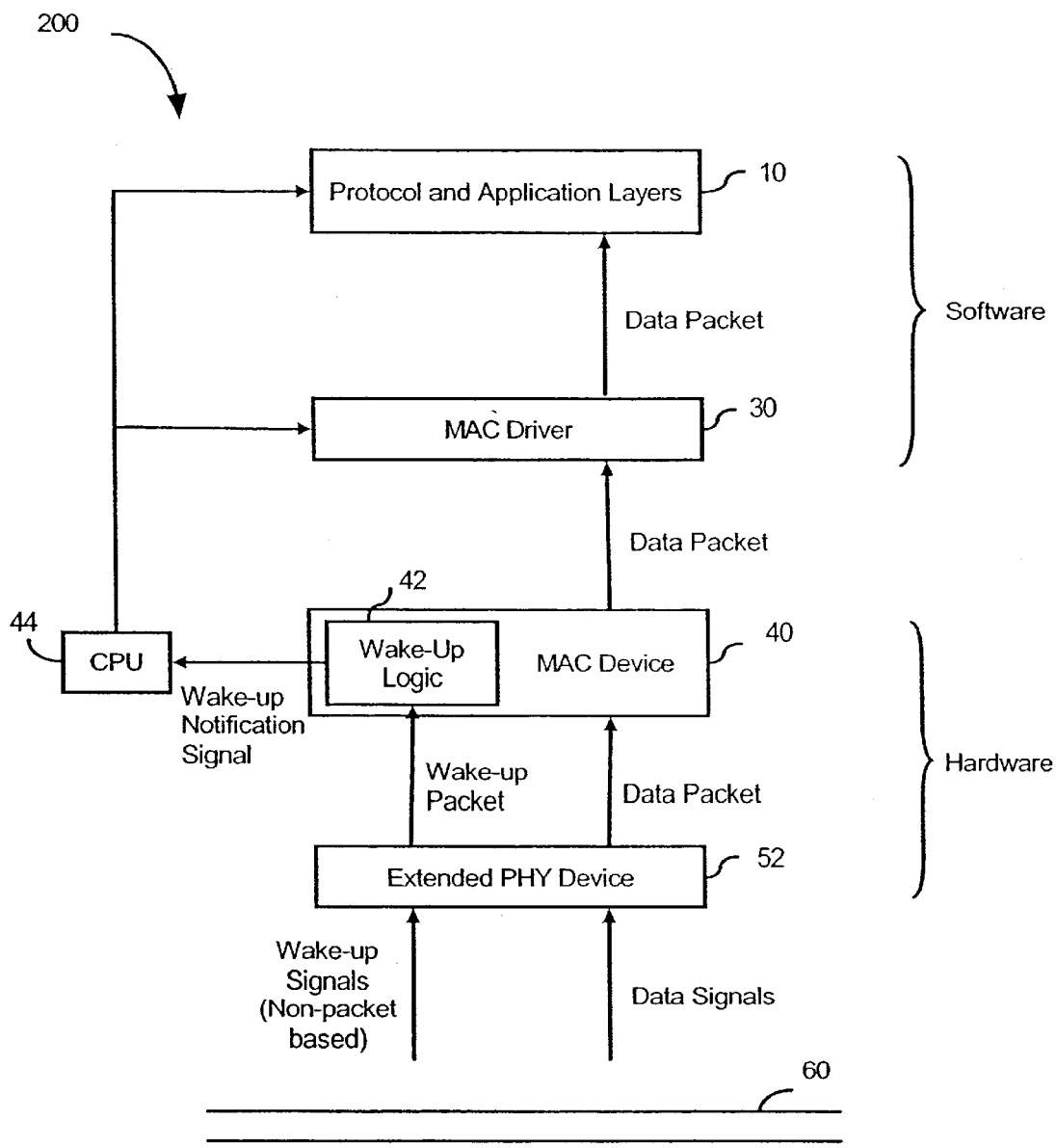
FIG. 4 is a diagram of a system for processing wake-up signals during a sleep mode of a computer in a network according to a second embodiment of the present invention.

FIG. 4 is a block diagram of a system 200 for processing wake-up signals during a sleep mode of a computer in a communications network according to a second embodiment of the present invention. In this embodiment, the system 200 is capable of processing a wake-up signal that is not packet-based, e.g., a wake-up signal can be a tone signal, a level signal (e.g., 5 volts), a pulse signal, an optical signal, etc. For example, the system 200 is able to process a wake-up signal representing a particular tone. This embodiment allows any system to wake up the sleeping components in response to a simple non-packet based wake-up signal. Once the system 200 is awake, however, it can process data packets according to known techniques.

As shown in FIG. 4, the system 200 includes protocol and application layers 10, a MAC driver 30, a MAC device 40 including wake-up logic 42, an extended PHY device 52, and a network medium 60, all operatively coupled. The components 10, 30, 40 and 60 are the same elements as the components 10, 30, 40 and 60 present in the system 100. The extended PHY device 52 is a modified version of a conventional PHY device and is capable of generating a standardized wake-up packet responsive to the non-packet based wake-up signals.

Particularly, when the system 200 is in a sleep mode and another computer desires to wake up the system 200, then that computer generates non-packet based wake-up signals (e.g., tone signals) and transmits them to the system 200 over the network medium 60. The extended PHY device 52 receives the wake-up signals, verifies that they are proper wake-up signals for the system 200, and generates a standardized wake-up packet in response to the wake-up signals. The generation of the wake-up packet can be accomplished by storing a predetermined, standardized wake-up packet in the extended PHY device 52 and outputting the stored packet when the proper wake-up signals are detected. The extended PHY device 52 then transmits the wake-up packet to the wake-up logic 42 of the MAC device 40.

Similar to the first embodiment, the wake-up logic 42 compares a data pattern in the received wake-up packet with a wake-up data pattern prestored in the MAC device 40 and verifies that the packet contains the proper wake-up data pattern. Then the wake-up logic 42 generates a predetermined wake-up notification signal to the CPU 44 which in turn wakes up the sleeping components such as the MAC driver 30 and the protocol and application layers 10.

Once the MAC driver 30 is awake, it informs the MAC device 40 that the MAC driver 30 is ready and able to receive data packets. In response, the MAC device 40 forwards to the MAC driver 30 any data packets that have been received by the MAC device 40 after the system 200 woke up. The MAC driver 30 then sends these packets to the protocol and application layers 10 for appropriate processing.

Although an extended protocol layer is not specifically shown in FIG. 4, the system 200 can include an extended protocol layer for processing additionally-encoded data packets that are received by the system 200 after the system 200 wakes up as discussed in connection with the system 100.

Figure 5:
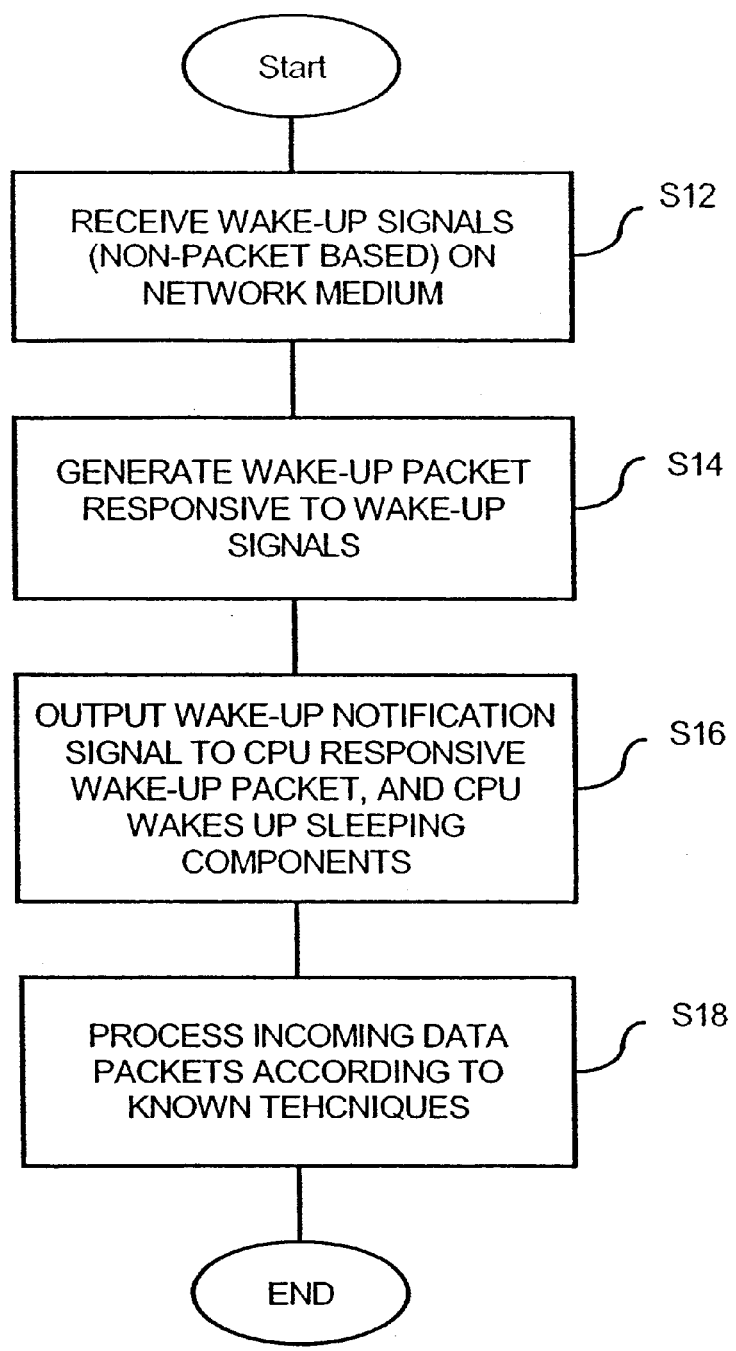
FIG. 5 is a flowchart illustrating the processing steps of a method for processing wake-up signals during a sleep mode of a computer in a network according to a second embodiment of the present invention.

FIG. 5 is a flowchart illustrating the processing steps of a method for processing wake-up signals in a communications network according to a second embodiment of the present invention. These processing steps can be implemented by the system 200 shown in FIG. 4. As shown in FIG. 5, when another computer transmits wake-up signals that are non-packet based (e.g., tone signals) to wake up the system 200, the extended PHY device 52 receives in Step S12 the wake-up signals on the network medium 60. Then the extended PHY device 52 in Step S14 verifies that the wake-up signals are proper wake-up signals by comparing the received signals with prestored signals and then generates a predetermined standardized wake-up packet recognizable by the MAC device 40. This can be accomplished by prestoring the standardized wake-up packet in the extended PHY device 52 and outputting the prestored wake-up packet whenever the proper wake-up signals are detected by the PHY device 52.

In Step S16, the standardized wake-up packet is received by the MAC device 40 which in turn generates and outputs a predetermined wake-up notification signal to the CPU 44 once the MAC device 40 verifies that the wake-up packet contains a proper wake-up data pattern as discussed above. Then the CPU 44 wakes up the sleeping components. If, for some reason, the wake-up logic 42 determines that the wake-up packet does not contain a proper wake-up data pattern, no wake-up notification signal is generated and the received packet may be discarded.

In Step S18, once the sleeping components of the system 200 are fully powered and return to their normal awake mode of operation under control of the CPU 44, the awakened MAC driver 30 informs the MAC device 40 that it is now ready to receive data packets from other computers. Then incoming data packets that have been processed by the extended PHY device 52 are then sent to the MAC driver 40. The MAC driver 40 processes these data packets according to known techniques, e.g., forwarding them to the application layers 10 for appropriate processing.

The present invention is applicable to any communications system requiring wake-up events that add additional encoding information to standardized data packets. For example, a conventional "in-Home" Phoneline Networking (HPN) system adds additional encoding data to a standard Ethernet data packet to bring robustness to the system and to overcome data impairments introduced in homes. The present invention can be used to process wake-up packets from the HPN system using an existing MAC device and MAC driver as discussed above and without having to design a new MAC device and MAC driver.

Furthermore, the present invention also enables the communications system to wake up its sleeping components in response to only a simple signal such as a tone signal. This simplifies the process of waking up the sleeping components in a network.

Accordingly, the present invention provides an improved PHY device which enables the system to process wake-up signals carrying additional encoding data. This is a significant advantage over conventional systems because the existing MAC device hardware and/or MAC driver software, currently available in the market, can be used without any modification to detect wake-up data patterns in a conventional manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for processing wake-up signals during a sleep mode of a computer in a communications network to wake up sleeping components of the computer, the system comprising:

an extended PHY (physical layer) device for receiving wake-up signals from a network medium, said wake-up signals carrying wake-up data as well as additionally-encoded data that is variable in length; converting the wake-up signals into an additionally-encoded data packet; and generating a standardized wake-up packet based on the additionally-encoded data packet; and a MAC (media access controller) device, coupled to the extended PHY device, for receiving the standardized wake-up packet and generating a wake-up notification signal in response to the standardized wake-up packet to wake up the sleeping components.

2. The system of claim 1, wherein the additionally-encoded data packet includes a standardized data packet and additional encoding data inserted in the standardized data packet.

3. The system of claim 2, wherein the standardized data packet contains wake-up data.

4. The system of claim 3, wherein the standardized data packet further contains processing data to be processed once the computer wakes up.

5. The system of claim 3, wherein the extended PHY device is prestored with information about the location of the wake-up data in the additionally-encoded data packet, which is then used to generate the standardized wake-up packet.

6. The system of claim 2, wherein the sleeping components of the computer include:

a MAC driver for controlling the MAC device and receiving the additionally-encoded data packet from the extended PHY device through the MAC device.

7. The system of claim 6, wherein the sleeping components of the computer further include;

an extended protocol layer for receiving the additionally-encoded data packet from the MAC driver and generating said standardized data packet based on the additionally-encoded data packet; and protocol and application layers for receiving said standardized data packet from the extended protocol layer and processing said standardized data packet.

8. The system of claim 7, wherein the extended protocol layer generates said standardized data packet by removing the additional encoding data from the additionally-encoded data packet.

9. A system for processing wake-up signals during a sleep mode of a computer in a communications network to wake up sleeping components of the computer, the system comprising:

an extended PHY (physical layer) device for receiving wake-up signals from a network medium and generating a standardized wake-up packet based on the wake-up signals, the wake-up signals being non-packet based signals; and a MAC (media access controller) device, coupled to the extended PHY device, for receiving the standardized wake-up packet and generating a wake-up notification signal in response to the standardized wake-up packet to wake up the sleeping components.

10. The system of claim 9, wherein the non-packet based signals are tone signals, level signals, pulse signals, or optical signals.

11. The system of claim 9, wherein, when the extended PHY device receives the wake-up signals, the extended PHY device compares the received wake-up signals with pre-stored signals to verify that the received wake-up signals are proper wake-up signals, and generates the standardized wake-up packet if the verification indicates that the received wake-up signals are proper wake-up signals.

12. The system of claim 11, wherein the sleeping components of the computer include:

a MAC driver for controlling the MAC device and receiving incoming data packets from the MAC device; and protocol and application layers for receiving the incoming data packets from the MAC driver and processing the incoming data packets.

13. The system of claim 11, wherein the sleeping components of the computer include;

a MAC driver for controlling the MAC device, and receiving incoming data packets from the MAC device, said incoming data packets containing additional encoding data;

an extended protocol layer for receiving said incoming data packets from the MAC driver and generating standardized data packets based on said incoming data packets; and protocol and application layers for receiving the standardized data packets from the extended protocol layer, and processing the standardized data packets.

14. The system of claim 13, wherein the extended protocol layer generates the standardized data packets by removing the additional encoding data from said incoming data packets.

15. An extended PHY (physical layer) device for use in a network system, the extended PHY device being capable of receiving wake-up signals from a network medium during a sleep mode of a computer in the network system, said wake-up signals carrying wake-up data as well as additionally-encoded data that is variable in length; converting the wake-up signals into an additionally-encoded data packet; and generating a standardized wake-up packet based on the additionally-encoded data packet, the standardized wake-up packet containing wake-up data for waking up sleeping components of the computer.

16. The extended PHY device of claim 15, wherein the additionally-encoded data packet includes a standardized data packet and additional encoding data inserted in the standardized data packet.

17. The extended PHY device of claim 15, wherein the extended PHY device is prestored with information about the location of the wake-up data in the additionally-encoded data packet, which is then used to generate the standardized wake-up packet.

18. An extended PHY (physical layer) device for use in a network system, the extended PHY device being capable of receiving non-packet based wake-up signals from a network medium during a sleep mode of a computer in the network system, and generating a standardized wake-up packet based on the wake-up signals, the standardized wake-up packet containing wake-up data for waking up sleeping components of the computer.

19. The extended PHY device of claim 18, wherein the non-packet based wake-up signals are tone signals, level signals, pulse signals, or optical signals.

20. The extended PHY device of claim 19, wherein, when the extended PHY device receives the wake-up signals, the extended PHY device compares the received wake-up signals with prestored signals to verify that the received wake-up signals are proper wake-up signals, and generates the standardized wake-up packet if the verification indicates that the received wake-up signals are proper wake-up signals.

21. A method for processing wake-up signals during a sleep mode of a computer in a communications network to wake up sleeping components of the computer, the wake-up signals carrying wake-up data as well as additionally-encoded data that is variable in length, the computer including an extended PHY (physical layer) device, the method comprising the steps of:

converting wake-up signals into an additionally-encoded data packet;

generating, by the extended PHY device, a standardized wake-up packet based on the additionally-encoded data packet; and generating a wake-up notification signal in response to the standardized wake-up packet to wake up the sleeping components of the computer.

22. The method of claim 21, wherein the additionally-encoded data packet includes a standardized data packet and additional encoding data inserted in the standardized data packet.

23. The method of claim 22, wherein the standardized data packet contains wake-up data.

24. The method of claim 23, wherein the standardized data packet further contains processing data to be processed once the computer wakes up.

25. The method of claim 23, further comprising:

prestoring, in the extended PHY device, information about the location of the wake-up data in the additionally-encoded data packet, which is then used to generate the standardized wake-up packet.

26. A method for processing wake-up signals during a sleep mode of a computer in a communications network to wake up sleeping components of the computer, the computer including an extended PHY (physical layer) device, the method comprising the steps of:

receiving wake-up signals from a network medium, the wake-up signals being non-packet based signals;

generating, by the extended PHY device, a standardized wake-up packet based on the wake-up signals; and generating a wake-up notification signal in response to the standardized wake-up packet to wake up the sleeping components of the computer.

27. The method of claim 26, wherein the non-packet based signals are tone signals, level signals, pulse signals, or optical signals.

28. The method of claim 26, wherein the step of generating the standardized wake-up packet includes:

comparing the received wake-up signals with prestored signals to verify that the received wake-up signals are proper wake-up signals, and generating the standardized wake-up packet if the comparing step indicates that the received wake-up signals are proper wake-up signals.

* * * * *